US010068433B2

(12) United States Patent
Nauman

(10) Patent No.: US 10,068,433 B2
(45) Date of Patent: Sep. 4, 2018

(54) WAGERING GAME HAVING MORPHING SYMBOL FEATURE

(75) Inventor: Jeff L. Nauman, Yorkville, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 606 days.

(21) Appl. No.: 13/161,001

(22) Filed: Jun. 15, 2011

(65) Prior Publication Data

US 2012/0322532 A1 Dec. 20, 2012

(51) Int. Cl.
*A63F 13/00* (2014.01)
*G07F 17/32* (2006.01)
*G07F 17/34* (2006.01)

(52) U.S. Cl.
CPC .......... *G07F 17/3267* (2013.01); *G07F 17/34* (2013.01)

(58) Field of Classification Search
CPC .............................. G07F 17/3267; G07F 17/34
USPC .............................. 463/20
See application file for complete search history.

(56) References Cited

U.S. PATENT DOCUMENTS 6,056,642 A 5/2000 Bennett
6,089,977 A 7/2000 Bennett
6,251,013 B1 6/2001 Bennett
6,270,411 B1 8/2001 Gura et al.
6,311,976 B1 11/2001 Yoseloff et al.
6,439,993 B1 * 8/2002 O'Halloran .................... 463/16
6,494,454 B2 12/2002 Adams
6,561,900 B1 5/2003 Baerlocher et al.
6,565,433 B1 5/2003 Baerlocher et al.
6,616,142 B2 9/2003 Adams
6,731,313 B1 5/2004 Kaminkow
6,780,109 B2 8/2004 Kaminkow
6,805,349 B2 10/2004 Baerlocher et al.
6,837,790 B1 1/2005 Kaminkow
6,866,583 B2 3/2005 Glavich et al.
6,905,406 B2 6/2005 Kaminkow et al.
6,918,832 B2 7/2005 Baerlocher et al.
6,921,335 B2 7/2005 Rodgers et al.
6,997,808 B2 2/2006 Rodgers et al.
7,048,275 B2 5/2006 Adams (Continued)

FOREIGN PATENT DOCUMENTS

GB 2092797 A 8/1982
GB 2096376 A 10/1982

(Continued)

*Primary Examiner* — Kang Hu
*Assistant Examiner* — Thomas H Henry
(74) *Attorney, Agent, or Firm* — Nixon Peabody LLP

(57) ABSTRACT

A gaming system for conducting a wagering game includes at least one input device, at least one display device, and at least one processor. The gaming system further includes at least one memory device that stores a plurality of instructions that, when executed by the at least one processor, cause the at least one processor to operate with the at least one display device and the at least one input device to display a wagering game having an array of symbols indicating a randomly selected outcome, the array of symbols including a plurality of rows and a plurality of columns, and, in response to the array of symbols including a special symbol, change the special symbol into a modified symbol, the modified symbol corresponding with a second symbol of the array of symbols to form a modified array, the second symbol being selected based on a predetermined condition.

20 Claims, 6 Drawing Sheets

(56) References Cited

U.S. PATENT DOCUMENTS

| | | | |
|---|---|---|---|
| 7,056,213 B2 | 6/2006 | Ching et al. | |
| 7,070,502 B1 | 7/2006 | Bussick et al. | |
| 7,074,127 B2 | 7/2006 | Cuddy et al. | |
| 7,090,580 B2 | 8/2006 | Rodgers et al. | |
| 7,094,148 B2 | 8/2006 | Baerlocher et al. | |
| 7,137,888 B2 | 11/2006 | Glavich et al. | |
| 7,169,042 B2 | 1/2007 | Muir et al. | |
| 7,226,359 B2 | 6/2007 | Bussick et al. | |
| 7,252,592 B2 | 8/2007 | Rodgers et al. | |
| 7,331,862 B2 | 2/2008 | Rodgers et al. | |
| 7,331,866 B2 | 2/2008 | Rodgers et al. | |
| 7,396,279 B2 | 7/2008 | Berman et al. | |
| 7,399,225 B2 | 7/2008 | Kaminkow | |
| 7,481,708 B2 | 1/2009 | Baerlocher et al. | |
| 7,481,709 B2 | 1/2009 | Bussick et al. | |
| 7,503,842 B2 | 3/2009 | Baerlocher | |
| 7,674,173 B2 | 3/2010 | Bennett | |
| 7,695,363 B2 | 4/2010 | Gilliland et al. | |
| 7,699,699 B2 | 4/2010 | Gilliland et al. | |
| 7,749,064 B2 * | 7/2010 | Marks et al. | 463/16 |
| 7,789,750 B2 | 9/2010 | Marks et al. | |
| 7,837,546 B2 | 11/2010 | Bennett et al. | |
| 8,235,794 B2 * | 8/2012 | Green et al. | 463/20 |
| 2004/0097280 A1 | 5/2004 | Gauselmann | |
| 2004/0229679 A1 | 11/2004 | Anderson et al. | |
| 2005/0049030 A1 | 3/2005 | Tachikawa | |
| 2005/0282607 A1 | 12/2005 | Gauselmann | |
| 2010/0210343 A1 | 8/2010 | Englman | |
| 2010/0298042 A1 | 11/2010 | Berman et al. | |

FOREIGN PATENT DOCUMENTS

| | | |
|---|---|---|
| GB | 2097160 A | 10/1982 |
| GB | 2119991 A | 11/1983 |
| GB | 2137392 A | 10/1984 |
| GB | 2144568 A | 3/1985 |

* cited by examiner

117
| | 1st Credit | 2nd Credit | 3rd Credit |
|---|---|---|---|
| A A A | 80 | 160 | 240 |
| K K K | 40 | 80 | 120 |
| Q Q Q | 20 | 40 | 60 |
| J J J | 10 | 20 | 30 |
118 119a 119b 119c
Fig. 5
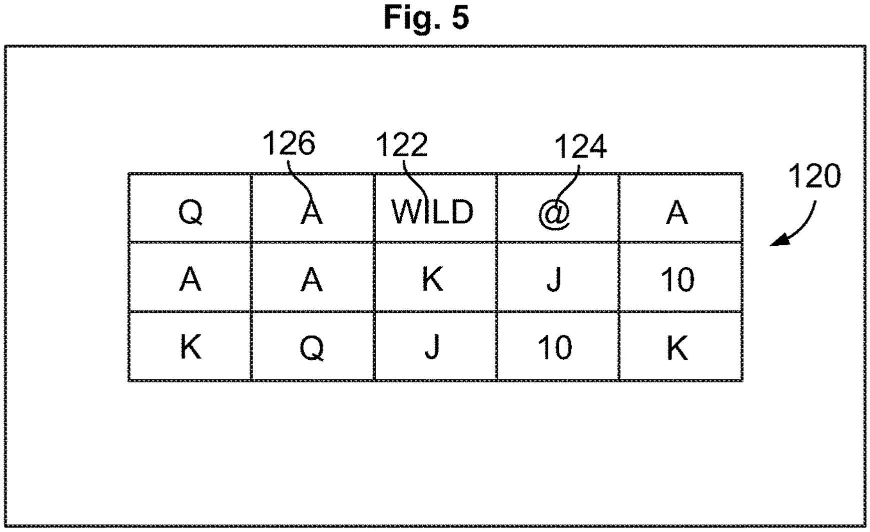
Fig. 6A
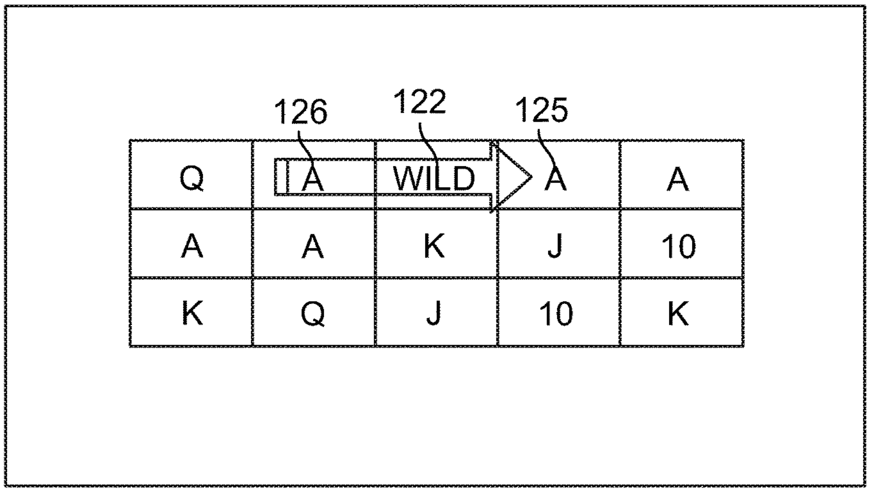
Fig. 6B

WAGERING GAME HAVING MORPHING SYMBOL FEATURE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus, and methods for playing wagering games, and more particularly, to wagering games having an symbol-morphing feature in which a symbol in an array of symbols takes the form of another symbol in the array of symbols.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

One concept that has been successfully employed to enhance the entertainment value of a game is the concept of a "secondary event" or "bonus game" that may be played in conjunction with a "basic" game. The secondary event may comprise any type of game, either similar to or completely different from the basic game, which is entered upon the occurrence of a selected event or outcome in the basic game. Generally, secondary events provide a greater expectation of winning than the basic game and may also be accompanied with more attractive or unusual video displays and/or audio. Secondary events may additionally award players with "progressive jackpot" awards that are funded, at least in part, by a percentage of coin-in from the gaming machine or a plurality of participating gaming machines. Because the secondary event concept offers tremendous advantages in player appeal and excitement relative to other known games, and because such games are attractive to both players and operators, there is a continuing need to develop gaming machines with new types and uses of secondary events to satisfy the demands of players and operators.

SUMMARY OF THE INVENTION

According to one aspect of the present invention, a gaming system for conducting a wagering game includes at least one input device, at least one display device, and at least one processor. The gaming system further includes at least one memory device that stores a plurality of instructions that, when executed by the at least one processor, cause the at least one processor to operate with the at least one display device and the at least one input device to display a wagering game having an array of symbols indicating a randomly selected outcome, the array of symbols including a plurality of rows and a plurality of columns, and, in response to the array of symbols including a special symbol, change the special symbol into a modified symbol, the modified symbol corresponding with a second symbol of the array of symbols to form a modified array, the second symbol being selected based on a predetermined condition.

According to another aspect of the invention, a computer-implemented method in a gaming system includes receiving a wager via at least one input device to play a wagering game and displaying on at least one display device the wagering game having an array of symbols indicating a randomly selected outcome, the array of symbols including a plurality of rows and a plurality of columns. The method further includes, in response to the array of symbols including a special symbol, using one or more processors to change the special symbol into a modified symbol, the modified symbol corresponding with a second symbol of the array of symbols to form a modified array, the second symbol being selected based on a predetermined condition.

According to another aspect of the invention, one or more machine-readable storage media includes instructions which, when executed by one or more processors, cause the one or more processors to perform operations. The operations include displaying a wagering game having an array of symbols indicating a randomly selected outcome, the array of symbols including a plurality of rows and a plurality of columns and, in response to the array of symbols including a special symbol, changing the special symbol into a modified symbol, the modified symbol corresponding with a second symbol of the array of symbols to form a modified array, the second symbol being selected based on a predetermined condition.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 5 illustrates one example of a pay table that may be used with the embodiments of the invention.

FIG. 6A is an image of a game screen of an exemplary wagering game displayed on a gaming terminal, according to another embodiment of the present invention.

FIG. 6B is an image of a game screen subsequent to the game screen of FIG. 5A.

Figure 1:
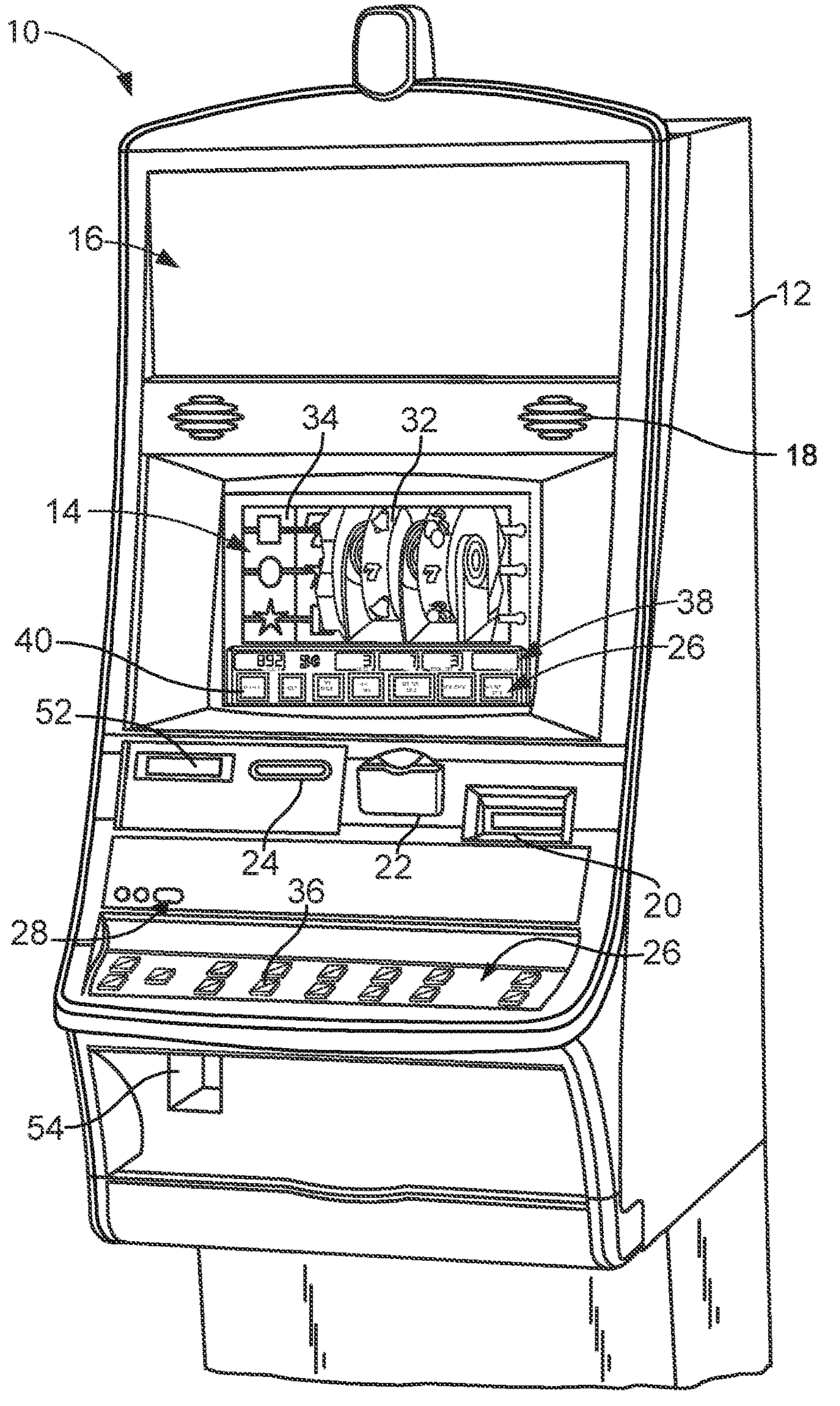
FIG. 1 PRIOR ART
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 11, 2007, titled “Handheld Device for Wagering Games,” which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled “Reel Spinning Slot Machine With Superimposed Video Image,” which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or “real-life” images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354, published on Mar. 6, 2003, entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
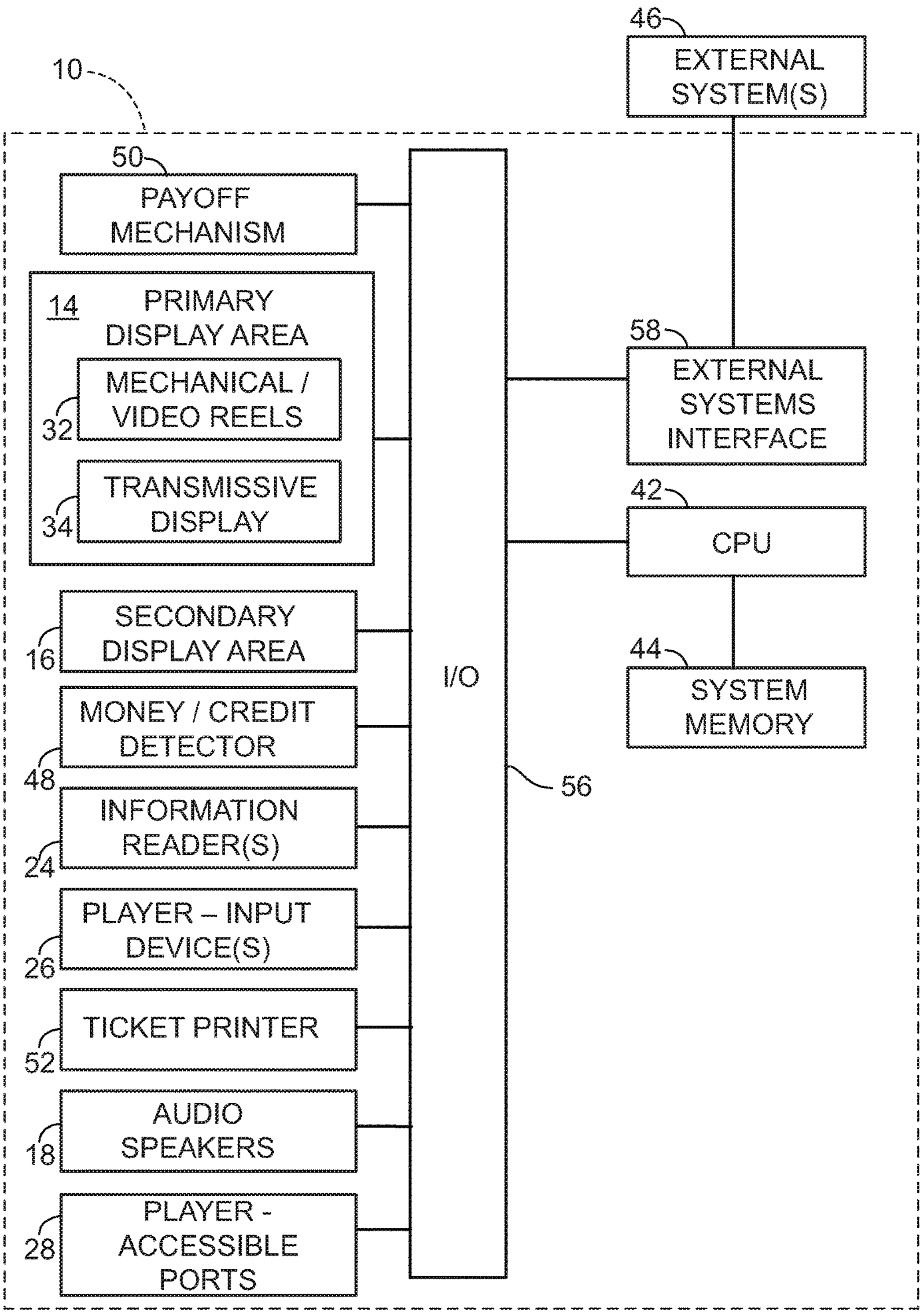
FIG. 2 PRIOR ART
FIG. 2 is a schematic view of a gaming system according to an embodiment of the present invention.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device(s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10 bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
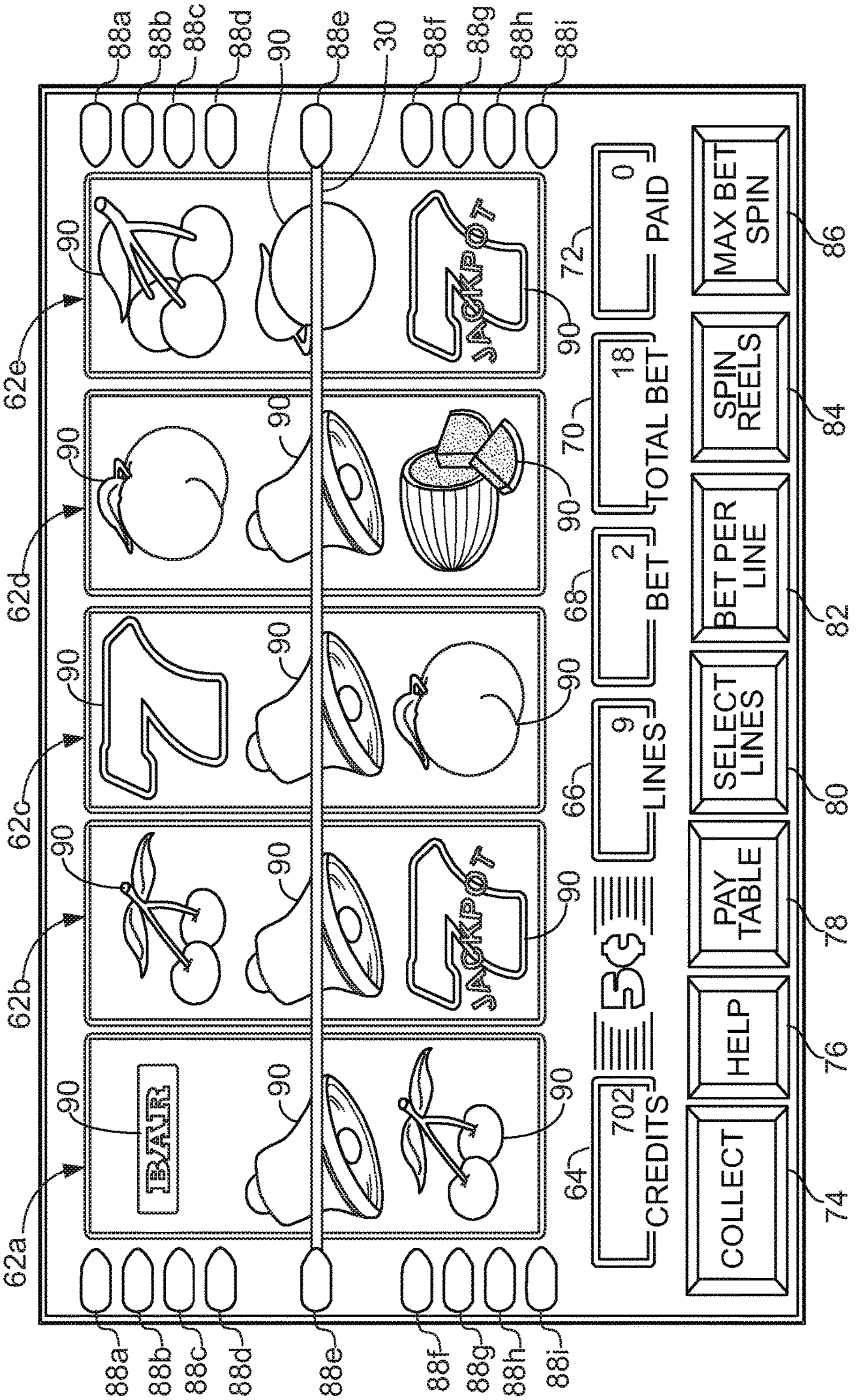
FIG. 3 PRIOR ART
FIG. 3 is an image of an exemplary basic-game screen of a wagering game displayed on a gaming terminal, according to an embodiment of the present invention.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

According to the embodiments described herein, one or more special symbols in an array of symbols "morphs," or changes, into a second one of the symbols displayed in the array of symbols. The morphing may occur during a basic game or a bonus game.

Figure 4A:
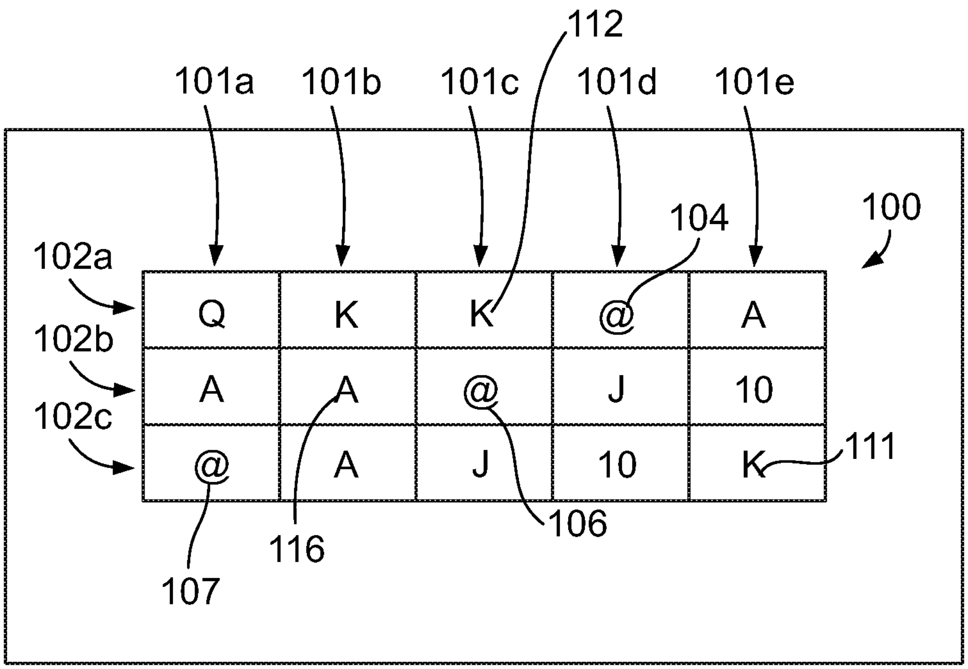
FIG. 4A is an image of a game screen of an exemplary wagering game displayed on a gaming terminal, according to an embodiment of the present invention.

Referring to FIG. 4A, an exemplary 3×5 array of symbols 100 having five columns 102*a-e* and three rows 101*a-c* is shown. The array 100 includes three morphing symbols 104, 106, 107 denoted by the "@" symbol. A morphing symbol may include any symbol, animation, or the like. The appearance of a morphing symbol in the array 100 triggers the array 100 to be modified such that the morphing symbol takes the form of a second, standard symbol in the array 100.

The symbol in the array 100 into which the morphing symbol(s) changes (the "second symbol") is based on a predetermined condition or condition set of the rules of the particular wagering game. For example, the predetermined condition may be that the second symbol is positioned adjacent to the morphing symbol. In the illustrated example of FIG. 4B, a modified array 108 is shown in which the morphing symbols 104, 106 of FIG. 4A take the form of the symbols positioned immediately to their left (e.g., in the same row 102*a*, 102*b*, one column to the left). Thus, the first morphing symbol 104 has morphed into a "K" symbol 110, like the "K" symbol 112 directly to its left. Likewise, the second morphing symbol 106 has morphed into an "A" symbol 114, like the "A" symbol 116 directly to its left. The modified array 108 may then be evaluated to determine whether any winning outcomes have been achieved.

If the morphing symbol is positioned such that the predetermined condition cannot be satisfied, the second symbol determination may be based on a second predetermined condition. For example, if a morphing symbol is positioned at an end of a row or column such that the predetermined condition that the second symbol is positioned adjacent to the morphing symbol cannot be satisfied, the second predetermined condition may dictate that the second symbol is positioned at the opposite end of the row or column (a "wrap-around" condition). Referring again to FIG. 4A, for example, the morphing symbol 107 of the first array 100 is positioned in the first column 101*a* such that there is no symbol immediately to its left. Thus, the morphing symbol 107 morphs into a "K" symbol 109, like the "K" symbol 111 positioned in the same row 102*c* of the opposing fifth column 101*e*, in a wrap-around fashion.

It is contemplated that the morphing symbol may change into a second symbol positioned anywhere in the array. For example, the morphing symbol may "morph" into a symbol positioned above or below the morphing symbol. This may be particularly desirable in embodiments in which "independent reels"—reels in which each symbol position is occupied by a different reel—are used. The second symbol also need not be positioned directly adjacent to the morphing symbol.

In other embodiments, the morphing symbol changes into a second symbol that is located in a mirrored/symmetrical position in the array of symbols. For example, if the morphing symbol is positioned in the second row 102*b* and the fifth column 101*e* of the array of FIG. 4A, the morphing symbol may change into a second symbol positioned in a horizontally symmetrical position—the second row 102*b* and the first column 101*a*. Alternatively, a morphing symbol positioned in, e.g., the first row 102*a* and the second column 101*b* may change into a second symbol positioned in a vertically symmetrical position—the third row 102*c* and the second column 101*b*. The morphing symbol may also change into a symbol that is located in a horizontally and vertically symmetrical position in the array of symbols, where the axis of symmetry is a diagonal line extending through the array. For example, a morphing symbol positioned in the first row 102*a* and the second column 101*b* may change into the symbol positioned in the third row 102*c* and fourth column 101*d*.

A special symbol, or morphing symbol, according to the embodiments described herein is distinguishable from a standard symbol in the array of symbols. Unlike standard symbols, morphing symbols preferably do not have a pay table value associated with them prior to morphing into another symbol in the array. It is contemplated, however, that a morphing symbol may have a pay table value associated therewith such that the morphing symbol may be considered a "paying" symbol. In such embodiments, the paying symbol would be pre-defined as a morphing symbol.

Figure 4B:
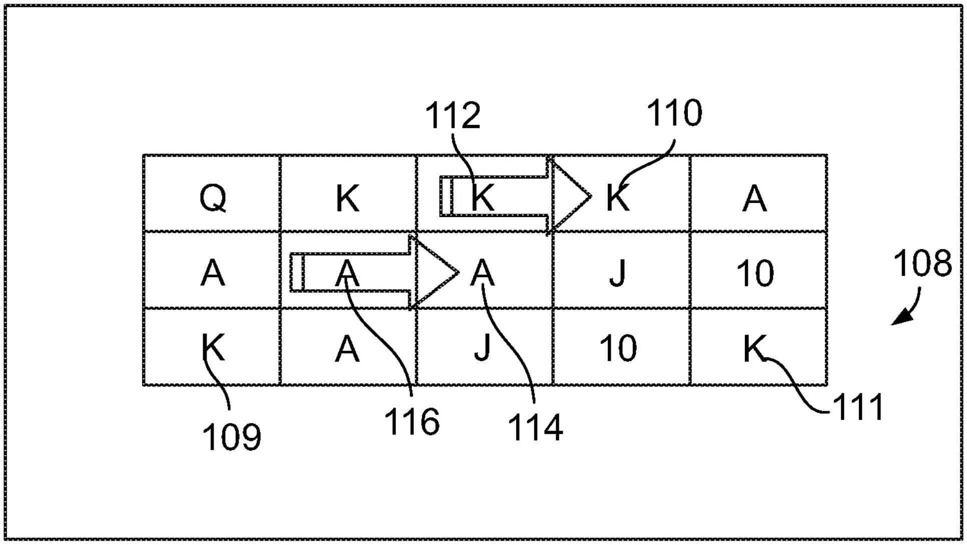
FIG. 4B is an image of a game screen subsequent to the game screen of FIG. 4A.

FIG. 5 illustrates a pay table 117 that corresponds to the symbol combinations that may be aligned along the paylines of FIGS. 4A and 4B. The pay table 117 is formatted with a column 118 at the far left of the pay table 117 illustrating a plurality of winning symbol combinations. A first payout column 119*a* indicates the award if the corresponding symbol combination is achieved through alignment of that symbol combination along one of the activated paylines if a single credit was wagered. A second payout column 119*b* indicates the award if the corresponding symbol combination is aligned along a payline if a second credit was wagered. A third payout column 119*c* indicates the award if the corresponding symbol combination is aligned along a payline if a third credit was wagered. It is contemplated that other suitable pay tables may be used.

It is noteworthy that the pay tables used with the embodiments of the present invention do not include special, morphing symbols. This is because the morphing symbols of the embodiments described herein do not have a pay table value associated therewith prior to morphing into another symbol in the array. Thus, the morphing symbols can be distinguished from the standard symbols listed in the pay table, WILD symbols, or the like, all of which can contribute to a standard winning symbol combination.

Turning now to the embodiment of FIG. 6A, an array of symbols 120 is shown in which a WILD symbol 122 is positioned immediately to the left of a morphing symbol 124. In this embodiment, rather than change the morphing symbol 124 into another WILD symbol, the morphing symbol 124 changes into a second symbol immediately to the left of the WILD symbol 122, or two symbol positions to the left of the morphing symbol 124. Thus, the morphing symbol 124 morphs into an "A" symbol 125, taking the form of an "A" symbol 126 located two symbol positions to its left, as shown in FIG. 6B.

Assuming that the array of symbols 120 of FIG. 6A includes a second morphing symbol, the second morphing symbol may change into a symbol corresponding with the symbol immediately to its left, as in FIGS. 4A, 4B, according to the first predetermined condition. Alternatively, the second morphing symbol may morph into another symbol in the array. For example, the presence of a WILD symbol to the left of one of the morphing symbols may cause all of the morphing symbols appearing in the array to morph according to the second predetermined condition, e.g., change into a second symbol positioned two symbol positions to their left. In another embodiment, all of the morphing symbols of the array 120 may morph into the same second symbol, e.g., the "A" symbol 126 positioned directly to the left of the WILD symbol 122.

It is contemplated that the predetermined condition may dictate that the morphing symbol change into a second morphing symbol, e.g., where the second symbol positioned directly to the left of the morphing symbol is a second morphing symbol. In this instance, both of the morphing symbols may change into a third symbol directly to the left of the second morphing symbol. Alternatively, a special condition may be triggered, e.g., both of the morphing symbols may become WILD.

According to another embodiment, the morphing symbol may be changed into a randomly-selected one of the other symbols in the array, resulting in a "random morph." The random morph may be a result of the predetermined condition or may be triggered by a trigger event. In one non-limiting example, the trigger event occurs when the predetermined condition cannot be satisfied (e.g., there is no symbol position adjacent to the morphing symbol, the symbol position adjacent to the morphing symbol is a WILD symbol, or the like). The randomly-selected symbol may be positioned anywhere in the array or it may be limited to certain symbol positions including, but not limited to, any one of the adjacent symbol position (next to, above, or below), the same row, the same column, or the like.

In yet another embodiment, the morphing symbol may be associated with a directional indicator, such as an arrow, indicating to the player which of the adjacent symbols the morphing symbol will be changed into. The arrow may point up, down, left, right, or diagonal. It is contemplated that the directional indicator may further be associated with another type of indicia for indicating, for example, whether the morphing symbol will change into the symbol directly to its left or two positions to its left. In one instance, this may be designated by the length of the arrow, where a shorter arrow designates the symbol immediately to the left of the morphing symbol and a longer arrow designates the symbol located two symbol positions to its left.

The random selection may be displayed in any suitable manner. For example, the possible second symbols may be highlighted, one at a time, until finally stopping on one of the symbols in the array, designating the second symbol into which the morphing symbol will change. The morphing symbol then takes the form of the highlighted second symbol, and the resulting modified array is evaluated.

In another embodiment, the second symbol in the array, into which the morphing symbol changes, is selected based on which of the symbols achieves the greatest payout for the player. Other restrictions may be placed on which of the symbols may be selected, e.g., the second symbol must be adjacent to (above, below, or next to) the morphing symbol. The second symbol may also be selected based on which symbol appears most frequently in the array, which may or may not correspond with the symbol achieving the greater payout for the player. If more than one symbol appears most frequently (the same number of times in the array), the processor may randomly select one, may select one based on which would provide a greater payout, or the like. Selecting the second symbol in these ways may be the default predetermined condition set by the gaming rules. Alternatively, such selection may occur in response to a triggering event such as, for example, the appearance of a "WILD-MORPH" symbol in the array.

According to another embodiment, the morphing symbol may be associated with a multiplier. Referring to the array 128 of FIG. 7A, for example, a first morphing symbol 130 is associated with a 3× multiplier. As shown in FIG. 7B, the morphing symbol 130 of FIG. 7A changes into a "A" symbol 132 because, like the embodiment discussed above with respect to FIGS. 4A-6B, the predetermined condition dictates that the morphing symbol morphs into a second symbol positioned immediately to its left. Furthermore, the morphed "A" symbol 132 maintains its pre-morph 3× multiplier such that any award associated with a pay line going through the morphed "A" symbol 132 in the modified array 142 of FIG. 7B is multiplied by three.

Figure 7A:
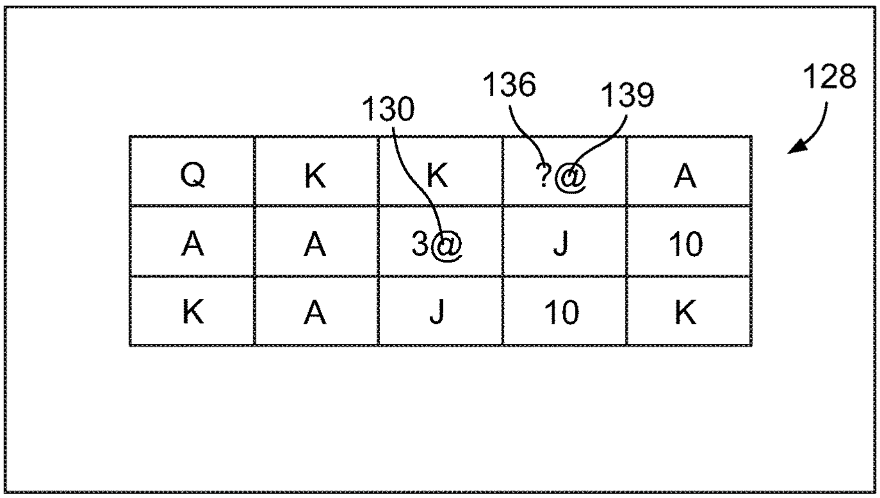
FIG. 7A is an image of a game screen of an exemplary wagering game displayed on a gaming terminal, according to yet another embodiment of the present invention.
Figure 7B:
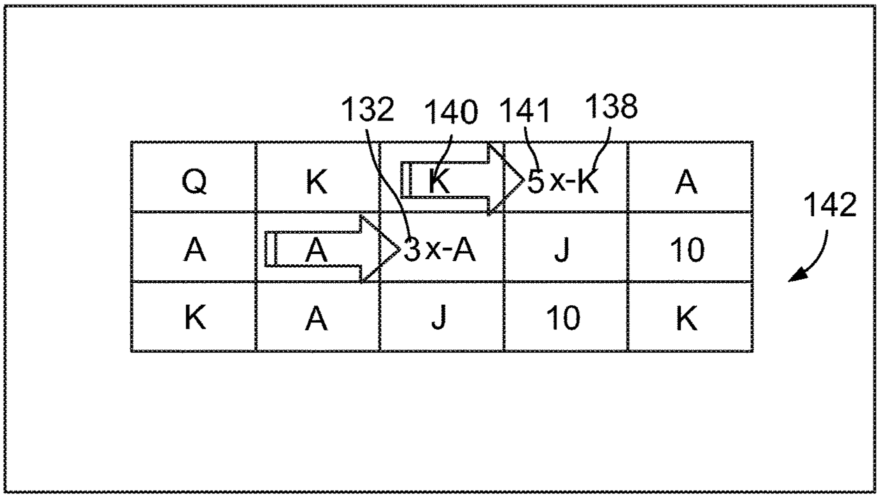
FIG. 7B is an image of a game screen subsequent to the game screen of FIG. 6A.

It is contemplated that the amount of the multiplier may not be displayed or achieved until after the morphing symbol has already "morphed." For example, the array 128 of FIG. 7A includes a "mystery morphing multiplier" 136, denoted by a question mark. As shown in FIG. 7B, after morphing into the "K" symbol 138 (corresponding with the "K" symbol 140 positioned immediately to the left of the morphing symbol 139), a 5× multiplier 141 is also revealed. Thus, any award associated with a pay line going through the morphed "K" symbol 138 in the modified array 142 of FIG. 7B is multiplied by five.

According to another embodiment, a morphing symbol may change into more than one symbol in the array, resulting in more than one modified array, each of which is evaluated for winning outcomes. This embodiment may occur, for example, in response to a "MULTI-MORPH" symbol appearing in the array of symbols. In one non-limiting example, the MULTI-MORPH symbol first changes into the symbol positioned directly to its left, and, after the resulting modified array is evaluated, the morphing symbol may then morph into the symbol positioned directly to its right, resulting in a second modified array. The second array may then be evaluated for additional payouts that may then be awarded to the player. It is also contemplated that the array may be evaluated prior to any morphing.

It is contemplated that there may be more than one predetermined condition associated with a particular gaming machine or system. For example, in embodiments in which an array of symbols includes more than one morphing symbol, like the array 100 of FIG. 4A, it is possible that the second symbols adopted by each of the morphing symbols may be located in different positions relative to each respective morphing symbol. For instance, it is possible for the first morphing symbol 104 to morph into a second symbol directly to its left (e.g., "K" symbol 112 of FIG. 4B), while the second morphing symbol 106 morphs into a randomly-selected second symbol or a second symbol located more than one space to its left, one or more positions to its right, one or more positions below the morphing symbol, etc.

The "morphing" described herein may be accompanied by audio or visual elements to enhance the player's gaming experience. For example, the second symbol (or plurality of possible symbols) into which the morphing symbol may be changed may be highlighted—simultaneously or in succession—by the display. Additionally or alternatively, an animation and/or sound elements may be used to show the morphing symbol "morphing" into the second symbol.

Figure 8:
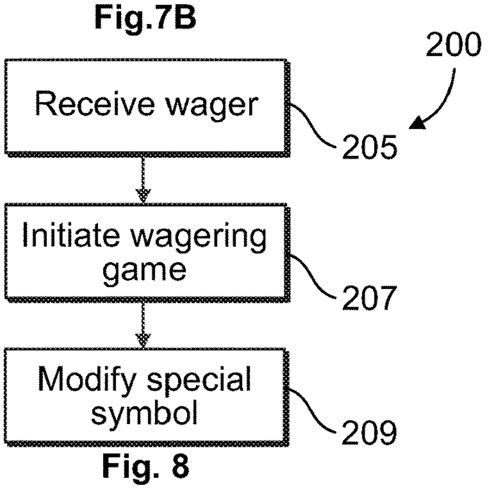
FIG. 8 is a flowchart for an algorithm that corresponds to instructions executed by a controller in accord with at least some aspects of the disclosed concepts.

FIG. 8, described by way of example above, represents one algorithm that corresponds to at least some instructions executed by the controller 42 and/or external systems 46 in FIG. 2 to perform the above-described functions associated with the disclosed concepts. By way of non-limiting example, the exemplary algorithm 200 of FIG. 8 includes, at block 205, a wager being placed or otherwise confirmed (e.g., via bill validator 20, coin acceptor 22, information reader 24, or other input device), where play of the wagering game is initiated at block 207. Initiating the wagering game generally includes displaying on at least one display device the wagering game having an array of symbols indicating a randomly selected outcome, where the array of symbols includes a plurality of rows and a plurality of columns. At block 209, in response to the array of symbols including a special symbol, the special symbol is changed into a modified symbol corresponding with a second symbol of the array of symbols to form a modified array. The second symbol is selected based on a predetermined condition.

It is contemplated that any of the features of the embodiments described above may be applied in any suitable combination with one another.

Each of these embodiments and obvious variations thereof is contemplated as falling within the spirit and scope of the claimed invention, which is set forth in the following claims.

What is claimed is:

1. A gaming system comprising:

a gaming machine primarily dedicated to playing at least one casino wagering game, the gaming machine including an electronic display device and one or more electronic input devices, at least one of the one or more electronic input devices configured to detect a physical item associated with a monetary value that establishes a credit balance, and at least one of the one or more electronic input devices to receive a cashout input that initiates a payout from the credit balance, the credit balance changing based on play of the wagering game;

one or more controllers configured to:

initiate the casino wagering game in response to a wager input, the wager input decreasing the credit balance;

determine a randomly selected outcome of the casino wagering game;

display on the electronic display device an array of symbols indicating the randomly selected outcome from a plurality of outcomes including one or more winning outcomes each represented solely by standard symbols in the array of symbols, the array of symbols including a plurality of rows and a plurality of columns;

in response to the array of symbols including a special symbol distinct from the standard symbols, the special symbol not included in the one or more winning outcomes, change the special symbol into a modified symbol and display the modified symbol, the modified symbol corresponding with a second standard symbol of the array of symbols to form a modified array, the second standard symbol being selected based on a predetermined condition of a predetermined location adjacent to the special symbol; and award an award in response to a winning outcome represented on the array, the modified array, or both the array and modified array.

2. The gaming system of claim 1, wherein, in response to the special symbol being positioned at an end of a row or column such that the predetermined condition cannot be satisfied, the second symbol is selected based on a second predetermined condition.

3. The gaming system of claim 2, wherein the second predetermined condition includes a second predetermined location at the opposite end of the row or column.

4. The gaming system of claim 1, wherein, in response to a symbol adjacent to the special symbol being a WILD symbol, selecting the second symbol based on a second predetermined condition.

5. The gaming system of claim 4, wherein the second predetermined condition includes a second predetermined location adjacent to the WILD symbol.

6. The gaming system of claim 1, wherein the predetermined condition includes random selection of one of the symbols in the array.

7. The gaming system of claim 1, wherein the predetermined condition includes selection of a second symbol that appears most frequently in the array.

8. The gaming system of claim 1, wherein the predetermined condition includes selection of a second symbol that yields a highest award in the modified array.

9. The gaming system of claim 1, wherein the special symbol and the modified symbol are associated with a multiplier.

10. The gaming system of claim 1, wherein the one or more controllers are further configured to change the modified symbol into a second modified symbol corresponding with a third symbol of the modified array to form a second modified array.

11. A method of operating a gaming system, the gaming system including one or more controllers and a gaming machine, the gaming machine primarily dedicated to playing at least one casino wagering game, the gaming machine including an electronic display device and one or more electronic input devices, the method comprising:

detecting, via at least one of one or more electronic input devices, a physical item associated with a monetary value, the monetary value establishing a credit balance that changes based on play of the casino wagering game;

receiving, via at least one of the one or more electronic input devices, a wager input to initiate the casino wagering game, the wager input decreasing the credit balance;

determining, by at least one of the one or more controllers, a randomly selected outcome of the casino wagering game;

displaying on the electronic display device the casino wagering game having an array of symbols indicating the randomly selected outcome from a plurality of outcomes including one or more winning outcomes each represented solely by standard symbols in the array of symbols, the array of symbols including a plurality of rows and a plurality of columns;

in response to the array of symbols including a special symbol distinct from the standard symbols, the special symbol not included in the one or more winning outcomes, using the one or more controllers to change the special symbol into a modified symbol and display the modified symbol on the electronic display device, the modified symbol corresponding with a second standard symbol of the array of symbols to form a modified array, the second standard symbol being selected based on a predetermined condition of a predetermined location adjacent to the special symbol; and receiving, via at least one of the one or more electronic input devices, a cashout input that initiates a payout from the credit balance.

12. The method of claim 11, further comprising, in response to the special symbol being positioned at an end of a row or column such that the predetermined condition cannot be satisfied, using the one or more processors to select the second symbol based on a second predetermined condition.

13. The method of claim 12, wherein the second predetermined condition includes a second predetermined location at the opposite end of the row or column.

14. The method of claim 11, further comprising, in response to a symbol adjacent to the special symbol being a WILD symbol, using the one or more controllers to select the second symbol based on a second predetermined condition.

15. The method of claim 14, wherein the second predetermined condition includes a second predetermined location adjacent to the WILD symbol.

16. The method of claim 11, wherein the predetermined condition includes random selection of one of the symbols in the array.

17. The method of claim 11, wherein the predetermined condition includes selection of a second symbol that appears most frequently in the array.

18. The method of claim 11, wherein the predetermined condition includes selection of a second symbol that yields a highest award in the modified array.

19. The method of claim 11, wherein the special symbol and the modified symbol are associated with a multiplier.

20. The method of claim 11, further comprising using the at least one of the one or more controllers to change the modified symbol into a second modified symbol corresponding with a third symbol of the modified array to form a second modified array.

* * * * *